(12) United States Patent
Oda et al.

(10) Patent No.: US 6,509,963 B2
(45) Date of Patent: Jan. 21, 2003

(54) PHOTOMETRIC APPARATUS

(75) Inventors: Hajime Oda, Chiba-ken (JP); Takeshi Iwasawa, Chiba-ken (JP)

(73) Assignee: Seiko Instruments Inc. (JP)

( * ) Notice: Subject to any disclaimer, the term of this patent is extended or adjusted under 35 U.S.C. 154(b) by 160 days.

(21) Appl. No.: 09/740,522

(22) Filed: Dec. 19, 2000

(65) Prior Publication Data

US 2001/0012105 A1 Aug. 9, 2001

(30) Foreign Application Priority Data

Dec. 20, 1999 (JP) ............................................. 11-360468

(51) Int. Cl.[7] .................................................. G01J 1/42
(52) U.S. Cl. ....................................................... 356/218
(58) Field of Search ................................. 356/218, 222, 356/225, 226; 396/91, 92, 100; 354/402, 406, 407, 408, 429–432

(56) References Cited

U.S. PATENT DOCUMENTS 5,302,997 A * 4/1994 Cocca ........................ 396/111
6,434,342 B1 * 8/2002 Nakano et al. ............. 396/541

* cited by examiner

Primary Examiner—Michael P. Stafira
(74) Attorney, Agent, or Firm—Adams & Wilks (57) ABSTRACT

It is possible to enhance accuracy in photometry measurements without an increase in unnecessary actual measurement data and design value data in the case where on a low ambient luminance side, an output of a first light sensor, which receives light collected from a large area, is linear and an output of a second light sensor, which receives light collected from a small area, is non-linear. The number of luminance measurement points used for performing measurement with the second light sensor is set at low ambient luminance values to be larger than the number of luminance measurement points used for performing measurements with the first light sensor. Accordingly, it is possible to enhance accuracy of photometry measurements without an increase in unnecessary actual measurement data and design value data where an output of a brightness detecting circuit based on an output of the second light sensor is non-linear and an output of a brightness detecting circuit based on an output of the first light sensor is linear.

13 Claims, 7 Drawing Sheets

PHOTOMETRIC APPARATUS

BACKGROUND OF THE INVENTION

1. Field of the Invention

The present invention relates generally to a photometric apparatus and, more particularly, to an improved photometric apparatus having plural light sensors for detecting light from different regions at plural luminance measurement points and having means for enhancing accuracy of photometry by increasing the number of luminance measurement points in regions where the respective light sensors have a non-linear characteristic.

2. Description of the Related Art

Conventionally, a photometric apparatus used, for example, as an exposure meter for a camera comprises an incident light measuring unit for measuring an average brightness of light irradiating a subject to be photographed, and a reflected light measuring unit for measuring brightness of a particular portion of the subject.

Figure 4:
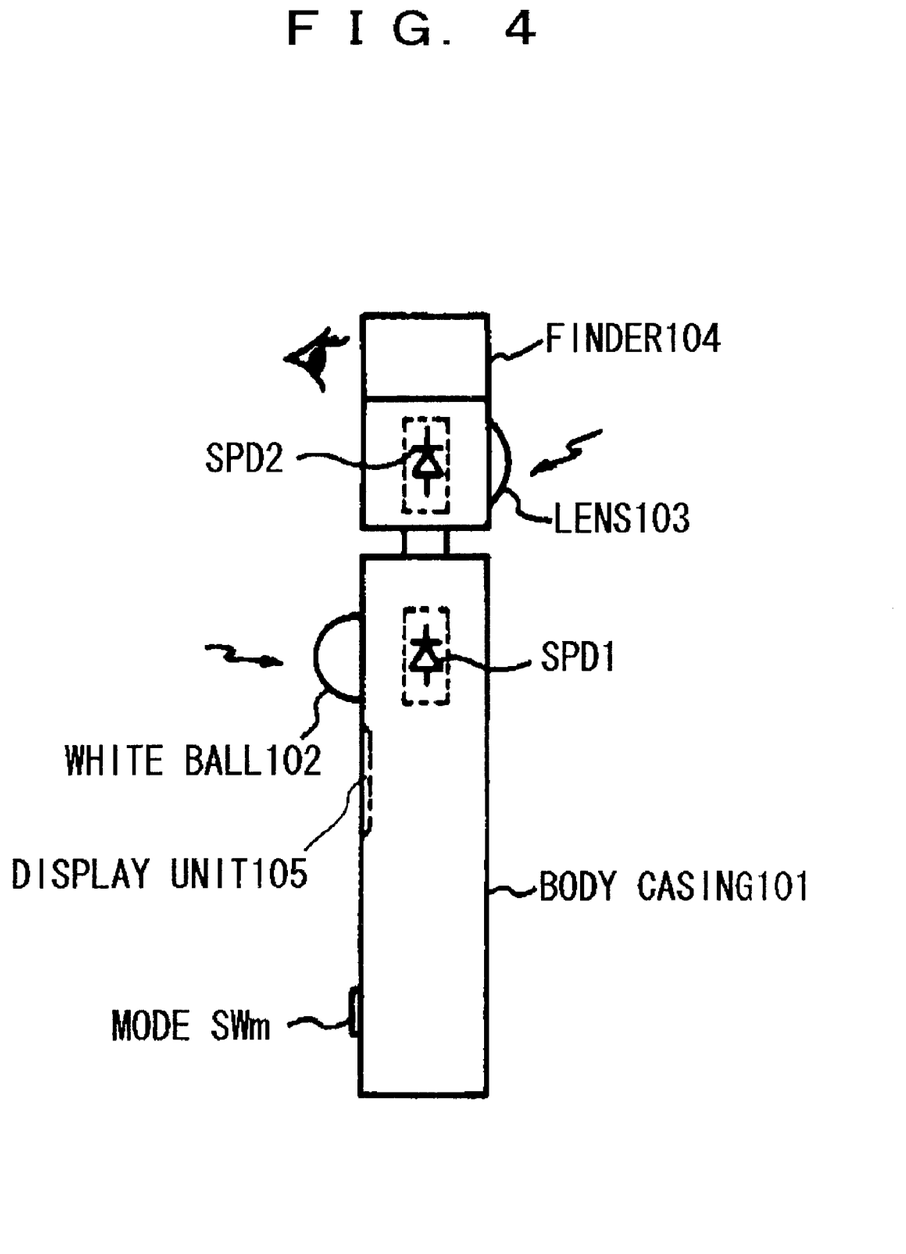
FIG. 4 is a plan view of a photometry apparatus according to an embodiment of the present invention.

FIG. 4 shows an example of the above-described photometric apparatus. In the illustrated apparatus, incident light is measured using a white ball 102 arranged on a front surface of a body case 101. In connection with the measurement of incident light, light is input from a first area corresponding to a relatively large angle of visibility (for example, 30° to 40°) through the white ball 102 arranged on the front surface of the body case 101 and is measured using a first light sensor SPD1, such as a silicon diode or the like, arranged behind the white ball 102 to detect the received light. In response to the output of the first light sensor SPD1, the average brightness of the surrounding area is measured. That is, brightness of the first area is measured on the basis of an output of the first light sensor SPD1. Measurement of reflected light is performed by so-called spot photometry, which uses a lens 103 arranged on a rear surface of the body case 101 to receive light from a second area corresponding to a relatively small angle of visibility (for example, 5° to 10°). For this purpose, a second light sensor SPD2, such as a silicon diode or the like, is arranged behind the lens 103 to detect the light received from the second area. In response to the received light, the brightness of a particular portion of the first area, that is, the brightness of the second area, is measured on the basis of output of the second light sensor SPD2.

In many cases, photometric devices are provided with a viewfinder 104 which allows the user to visually define the specific portion of the subject for which measurement of reflected light is desired. Normally, a display unit 105 for displaying the results of measurement and a mode switch SWm are also provided on the front surface of the body case 101 where the white ball 102 is provided. The lens 103 may be mounted on the surface of the body case 101 opposite the surface on which the white ball 102 is provided, or the lens may be mounted so that it is rotatable relative to the position of the white ball 102 on the body case 101.

Figure 5:
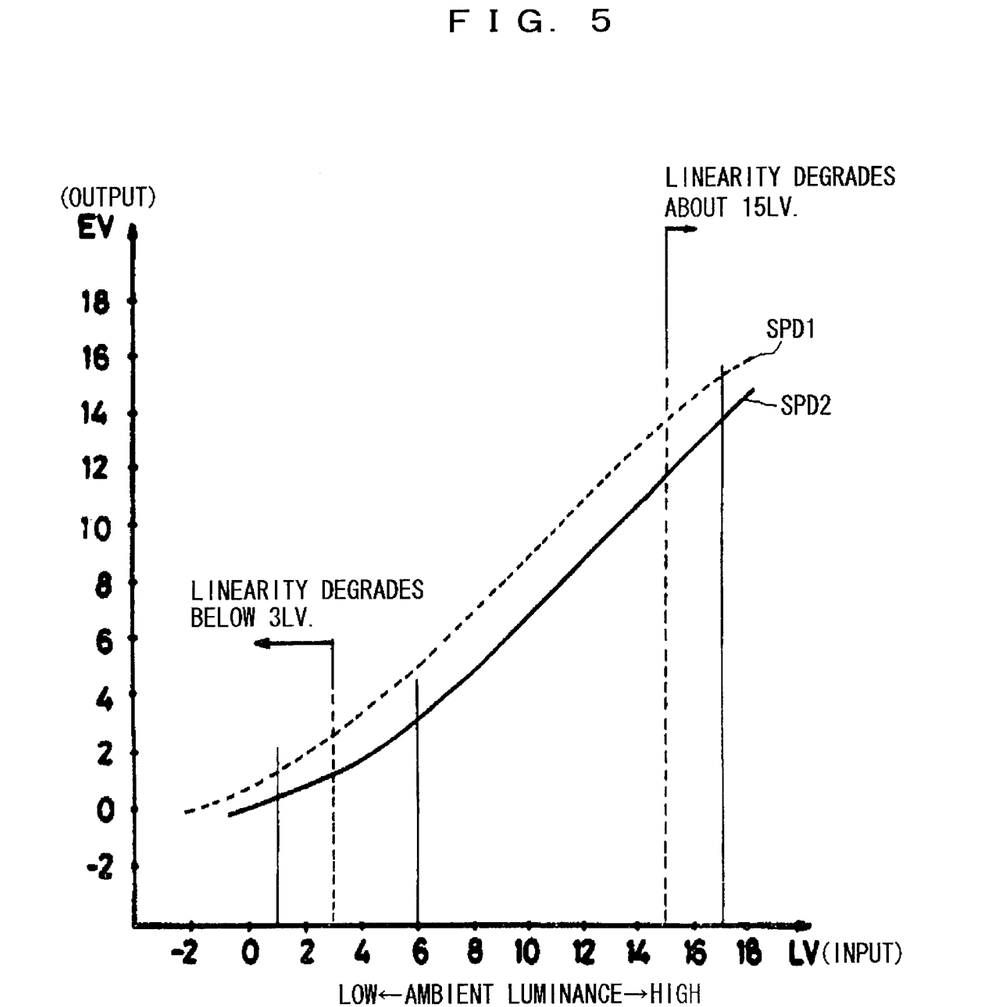
FIG. 5 is a view illustrating input/output characteristics of first and second light sensors SPD1, SPD2.

As described above, the second light sensor SPD2 used for measurement of reflected light receives light collected from a smaller area than that used for measurement of incident light. Therefore, when performing measurement of incident light and measurement of reflected light under the same ambient luminance, the quantity of light incident upon the second light sensor SPD2 used for measurement of reflected light is smaller than the quantity of light incident upon the first light sensor SPD1 used for measurement of incident light. Thus, the photoelectric current output by the second light sensor SPD2 is also smaller than that output by the first light sensor SPD1. As is often the case, identical components are used in parallel light detection circuits to simplify construction and avoid errors due to circuit constants occurring when circuit components of different construction are used. Accordingly, in the case where light sources having the same structure are employed for the first and second light sensors SPD1 and SPD2, and photoelectric current-to-voltage conversion circuits having the same performance characteristics are used to convert photoelectric currents output by the light sensors into voltages, the relationship between input and output becomes that as shown in FIG. 5. More specifically, when photometry is performed under the same ambient luminance, the output of the photoelectric current-to-voltage conversion circuit associated with the second light sensor SPD2 used for the measurement of reflected light has a smaller value than that output by the photoelectric current-to-voltage conversion circuit associated with the first light sensor SPD1 used for the measurement of incident light.

An input/output characteristic of the light sensors will be described below with reference to FIG. 5. Generally, the relationship between the input (luminance value LV) versus the output (exposure value EV) characteristic of a light sensor used in exposure meters containing a photoelectric current-to-voltage conversion circuit is linear in a predetermined range of luminance values, but tends to become non-linear in its output in areas having higher or lower luminance values than the predetermined range of luminance values. This loss of linearity is usually more pronounced on the low luminance side of the predetermined range. Such tendency is illustrated in the graph shown in FIG. 5. Due to the above-described difference in the quantity of light incident upon the first and second light sensors SPD1 and SPD2, the photoelectric current output by the second light sensor SPD2 begins on the low luminance side to become non-linear at a higher luminance value (LV about 6) than that of the first light sensor SPD1. Conversely, because a higher intensity light is incident on the first light sensor SPD1, the photoelectric current output by the first light sensor SPD1 begins on the high luminance side to become non-linear at a lower luminance value (LV about 15) than that of the second light sensor SPD2. As a result, the predetermined range of luminance values having linearity, for which signal processing is easily conducted, is normally deemed the measurable luminance range of the device.

A method of linear interpolation such as that disclosed for example, in Japanese Patent Laid-Open No. 44018/1992 (which is incorporated herein by reference), has been used for correcting errors in measurement results due to errors in products into design values. Simply explained, the method of linear interpolation disclosed therein comprises the storing of design values (design data) and actual measurement values (actual measurement data) of outputs from a plurality of measurement points, which are preset for the ambient luminance, finding design values of outputs for the measurable area on the basis of the preset values stored by way of linear interpolation in actual use, and correcting actual measurement values in actual use into the design values thus found by linear interpolation, on the basis of characteristic errors between the stored actual measurement values and the design values. For example, with a photometric apparatus having one sensor, photometry is actually performed in brightness at a plurality of predetermined luminance measurement points in a process of manufacture or product inspection, and actual measurement values and design values at that time are stored as correction data in a nonvolatile memory such as EEPROM or the like. During actual use of the device, the correction data stored in nonvolatile memory is used to conform actual measurement values obtained by the photometric apparatus to design values obtained by performing linear interpolation on a plurality of design values in the correction data stored in the nonvolatile memory.

While an example of linear interpolation using one sensor is described above, a method of correcting actual measurement values in actual use into design values is carried out under the same general scheme as described above in the case where two sensors are used. For example, photometry is actually performed in brightness (LV=1, 4, 7, 10, 13, 16 in the case shown in FIG. 6) at ambient luminance measurement points, respectively, as indicated by P51 to P56 and Q51 to Q56 during manufacture and product inspection. Actual measurement data and design data, which are obtained by the first and second light sensors SPD1, SPD2 at the respective ambient luminance measurement points, are stored as correction data in the nonvolatile memory. Actual measurement values obtained by the first and second light sensors SPD1, SPD2 are corrected into design values during actual use of the photometric device by the use of the correction data stored in EEPROM.

Figure 6:
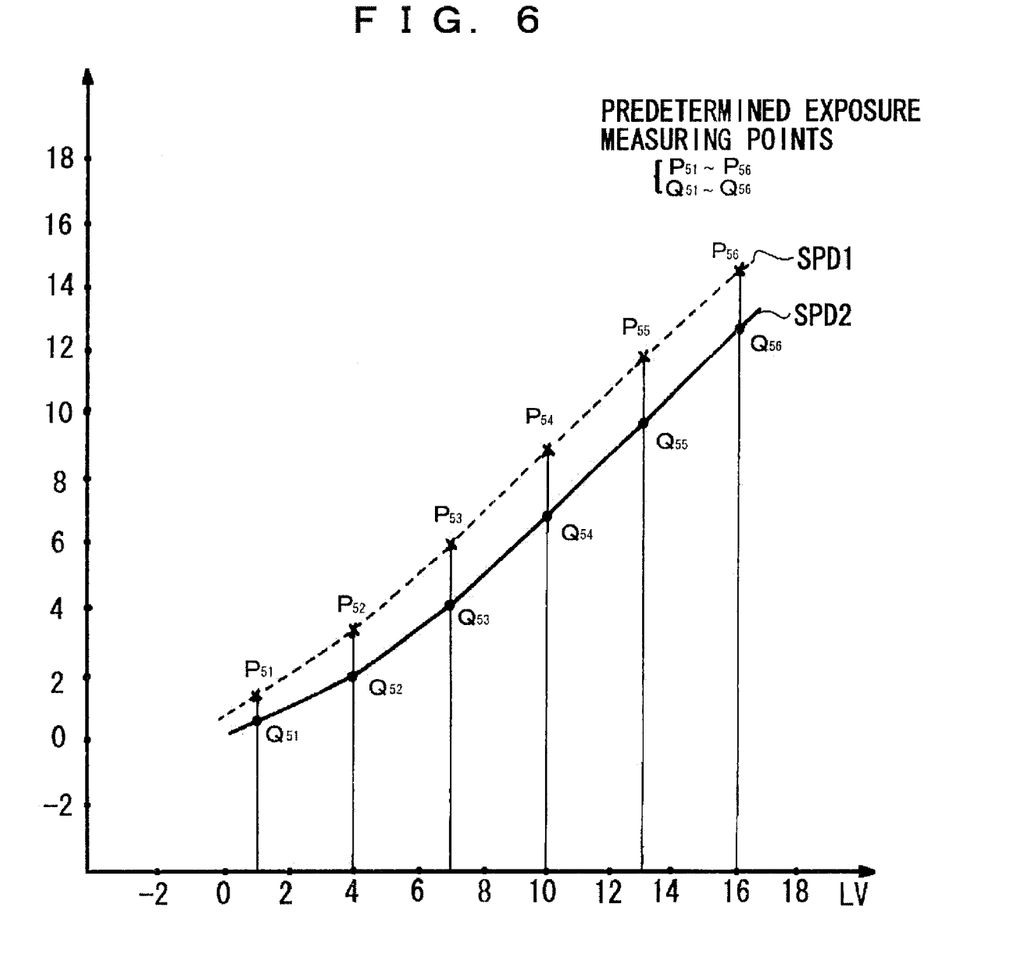
FIG. 6 is a view illustrating input/output characteristics of first and second light sensors SPD1, SPD2 and ambient luminance measurement points, and illustrating conventional ambient luminance measurement points.

Conventionally, as shown in FIG. 6, a plurality of preset ambient luminance measurement points used for photometry with a plurality of light sensors, such as the fist and second light sensors SPD1 and SPD2, are the same in number and luminance.

As described above, a plurality of sensors SPD1 and SPD2 having different quantities of incident light even in the same ambient luminance are different in input/output characteristics on low and high luminance sides in a predetermined luminance area of the ambient luminance, resulting in the drawback that one sensor has linear input/output characteristics while another sensor does not have linear input/output characteristics.

Figure 7:
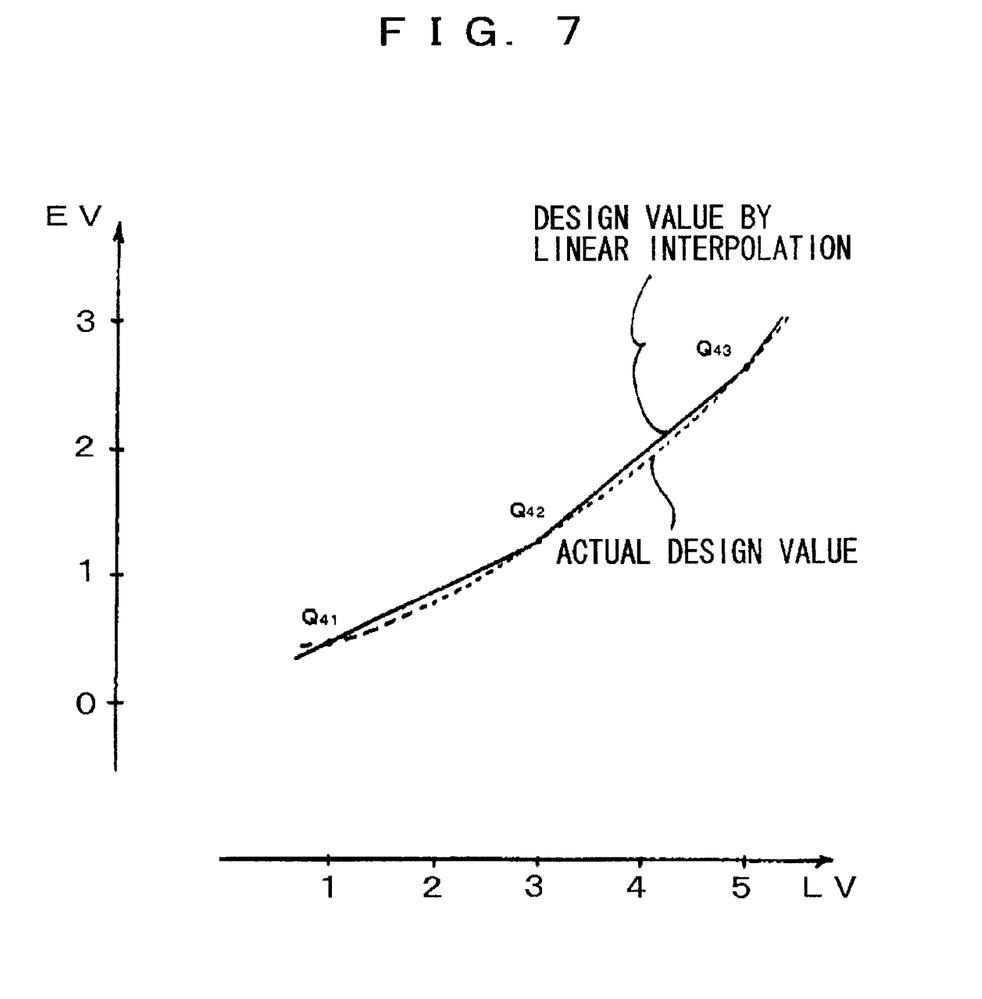
FIG. 7 is a view illustrating the linear interpolation method.

This drawback presents a problem where preset luminance measurement points are the same in number and luminance value. In such circumstances, when it is attempted to conform design values by increasing the number of ambient luminance measurement points in one light sensor so as to improve its output accuracy in a given luminance area, a large amount of unnecessary data is produced in areas where input/output characteristics are linear. For example, when an area which presents a non-linear, curvilinear input/output characteristic as illustrated by a broken line in FIG. 7 is selected for correction using linear interpolation, to produce actual, curvilinear design values with high accuracy, there is a disadvantage in that measurements using a light sensor which has a linear input/output characteristic in that area will produce a large amount of unnecessary correction data. Thus, the amount of unnecessary data becomes large. On the other hand, when the number of ambient luminance measurement points in the luminance area is reduced to eliminate such a disadvantage, a difference between the design values thus obtained by linear interpolation and the actual, curvilinear design values becomes large on a side having non-linear input/output characteristics to thereby degrade the accuracy of output values.

SUMMARY OF THE INVENTION

In view of the foregoing drawbacks of the conventional art, an object of the present invention is to provide a photometric apparatus capable of obtaining accurate luminance measurements using a plurality of light sensors having the same characteristics.

Another object of the present invention is to provide a photometric apparatus having means for enhancing accuracy of photometry by performing linear interpolation without producing a large amount of unnecessary data.

Still another object of the present invention is to provide a photometric apparatus of the foregoing type in which the accuracy of photometry is enhanced by separately setting the number of respective ambient luminance measurement points for a plurality of light sensors in accordance with the input/output characteristics of the respective light sensors.

Yet another object of the present invention is to provide a photometric apparatus of the foregoing type in which the accuracy of photometry is enhanced by increasing the set number of luminance measurement points used where respective photosensors have non-linear input/output characteristics.

In order to achieve the foregoing objects and others, in one aspect of the present invention a photometric apparatus is provided with improved accuracy. The photometric apparatus comprises a first light sensor for receiving light from a first area, a second light sensor for receiving light from a second area smaller than the first area, a brightness detecting circuit for outputting a first actual measurement value representing brightness in the first area in accordance with an output of the first light sensor and outputting a second actual measurement value representing brightness in the second area in accordance with an output of the second light sensor, a storage circuit for storing actual measurement data and design value data of the first light sensor obtained at a plurality of first ambient luminance measurement points and actual measurement data and design value data of the second light sensor obtained at a plurality of second ambient luminance measurement points, and a correction circuit for correcting the first and second actual measurement values, respectively, into first and second design values, based on the actual measurement data and design value stored, wherein the number of second ambient luminance measurement points is set to be larger at low ambient luminance values than the number of first ambient luminance measurement points and/or the number of first ambient luminance measurement points is set to be larger at high ambient luminance values than the number of second ambient luminance measurement points.

By the above construction, photometry with enhanced accuracy is made possible because the number of respective ambient luminance measurement points for the first and second light sensors may be set separately in accordance with the input/output characteristics of the first and second light sensors. Accordingly, the plurality of second ambient luminance measurement points is set to be larger or more dense at low ambient luminance values than the number of first ambient luminance measurement points. Hence, it is possible to enhance accuracy in photometry without an increase in unnecessary actual measurement data and design value data in the case where an output of the brightness detecting circuit based on an output of the second light sensor is non-linear and an output of the brightness detecting circuit based on an output of the first light sensor is linear. In particular, it is possible to enhance accuracy of photometry measurements on a low ambient luminance side where a minute photoelectric current is treated, measurement points vary greatly due to noise, and the quantity of incident light is small.

Also, it is possible to enhance accuracy of photometry measurements without an increase in unnecessary actual measurement data and design value data in the case where an output of the brightness detecting circuit based on an output of the first light sensor is non-linear and an output of the brightness detecting circuit based on an output of the second light sensor is linear because the number of first ambient luminance measurement points is set to be larger or more dense at high ambient luminance values than the number of second ambient luminance measurement points.

By providing that the number of second ambient luminance measurement points is set to be larger in number than the number of first ambient luminance measurement points, it is possible to enhance accuracy of photometry measurements without an increase in unnecessary actual measurement data and design value data in the case where an output of the brightness detecting circuit based on an output of the second light sensor is non-linear and an output of the brightness detecting circuit based on an output of the first light sensor is linear.

Also, by providing that the number of first ambient luminance measurement points is set to be larger in number than the number of second ambient luminance measurement points, it is possible to enhance accuracy of photometry measurements without an increase in unnecessary actual measurement data and design value data in the case where an output of the brightness detecting circuit based on an output of the first light sensor is non-linear and an output of the brightness detecting circuit based on an output of the second light sensor is linear.

DETAILED DESCRIPTION OF THE PREFERRED EMBODIMENTS

The present invention will be described below with reference to an embodiment shown in the drawings, it being understood that the following description is intended to be exemplary and not limiting of the appended claims.

Figure 1:
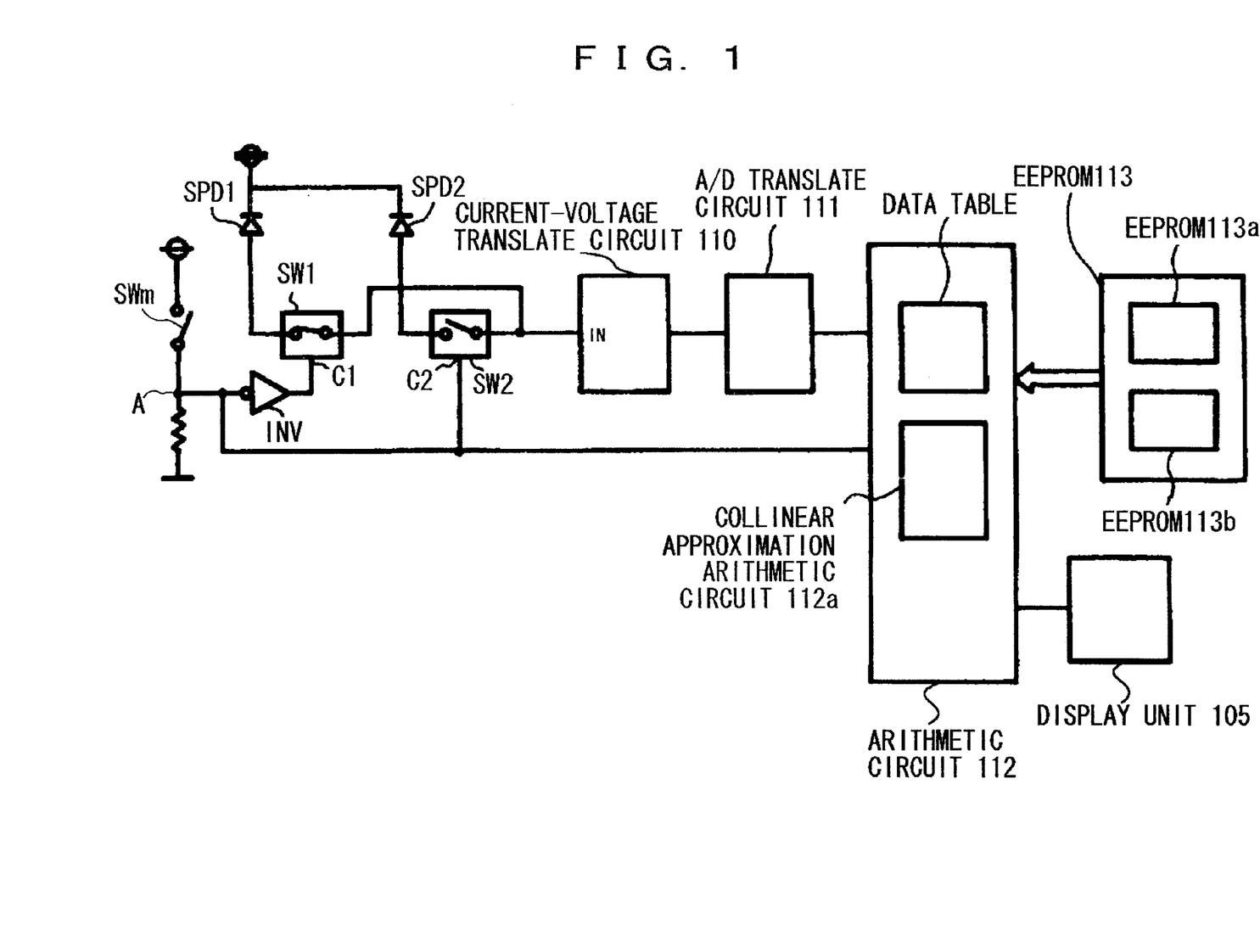
FIG. 1 is a circuit diagram of a photometry apparatus according to an embodiment of the present invention.

FIG. 1 shows an example of the present invention as embodied in an exposure meter of the type shown in FIG. 4. In FIG. 1, the same or similar constituent parts as those shown in FIG. 4 are designated by the same reference numerals, and a detailed description thereof is omitted. In FIG. 1, a first light sensor SPD1 for measurement of incident light is connected at one end thereof to a high potential side of an electric power source, and at the other end thereof to an input terminal In of a current-to-voltage conversion circuit 110 via a first semiconductor analog switch SW1. A second light sensor SPD2 for measurement of reflected light is connected at one end thereof to the high potential side of the electric power source in the same manner as the one end of the first light sensor SPD1, and at the other end thereof to the input terminal In of the current-to-voltage conversion circuit 110 via a second semiconductor analog switch SW2.

The first and second semiconductor analog switches SW1, SW2 are turned ON when their respective control terminals C1, C2 are placed in an "H" state. The control terminal C1 of the semiconductor analog switch SW1 is connected to a terminal A via an inverter INV, and the control terminal C2 of the semiconductor analog switch SW2 is directly connected to the terminal A without being passed through the inverter INV. Accordingly, only one of the semiconductor analog switches SW1, SW2 is selectively turned ON at a time in accordance with the ON/OFF state of a mode switch SWm. The respective one of the semiconductor analog switches that is turned ON in accordance with switching of the ON/OFF state of the mode switch SWm is switched over based on the ON/OFF state of the mode switch SWm. That is, that light sensor which is to be connected to the input terminal In of the current-to-voltage conversion circuit 110 is selected on the basis of the ON/OFF state of the mode switch SWm.

The current-to-voltage conversion circuit 110 serves to convert: a photoelectric current which is supplied to the input terminal In into a voltage and to output the same, and its output is converted into a digital value by an A/D conversion circuit 111, which digital value is processed by an arithmetic circuit 112. A result of the processing is indicated at a display unit 105.

The arithmetic circuit 112 serves as a circuit for detecting brightness and is composed of a CPU, a ROM, a RAM and the like. The arithmetic circuit 112 detects the voltage level at the terminal A to thereby determine which one of the first and second light sensors SPD1, SPD2 is currently selected. That is, the arithmetic circuit 112 determines whether measurement of incident light or measurement of reflected light has been selected by operation of the mode switch SWm. Based on this determination, the arithmetic circuit 112 calculates a first actual measurement value Y1a based on an output of the first light sensor SPD1 or a second actual measurement value Y2a based on an output of the second light sensor SPD2 according to an output of the A/D conversion circuit 111. The arithmetic circuit 112 includes a collinear approximation arithmetic circuit 112a as a correction circuit, and contents based on an output of the collinear approximation arithmetic circuit 112a are indicated on the display unit 105.

The collinear approximation arithmetic circuit 112a corresponds to the collinear approximation arithmetic circuit 9a disclosed in the above-mentioned Japanese Patent Laid-Open No. 44018/1992, and functions to correct the first actual measurement value Y1a and the second actual measurement value Y2a into a first design value X1a and a second design value X2a by way of formulae (1) and (2) shown below, in which actual measurement data Y1n (n=1, 2, 3, . . . ), Y2n (n=1, 2, 3, . . . ) and design value data X1n (n=1, 2, 3, . . . ), X2n (n=1, 2, 3, . . . ) stored in an EEPROM 113, as described below, are used.

$$X1a = X1n + (X1n+1 - X1n/Y1n+1 - Y1n)(Y1a - Y1n) \quad (1)$$

wherein $Y1n \leq Y1a < (Y1n+1)$; and $$X2a = X2n + (X2n+1 - X2n/Y2n+1 - Y2n)(Y2a - Y2n) \quad (2)$$

where $Y2n \leq Y2a < (Y2n+1)$

The EEPROM 113 serving as a memory circuit includes an EEPROM 113a for the first light sensor SPD1 and an EEPROM 113b for the second light sensor SPD2, and stores various data, as described below, in the manner described in the above-mentioned Japanese Patent Laid-Open No. 44018/1992. The EEPROM 113a stores the actual measurement data Y1n (n=1, 2, 3, . . . ) obtained by the light sensor SPD1 at a plurality of first ambient luminance measurement points and the design value data X1n (n=1, 2, 3, . . . ). Similarly, the EEPROM 113b stores the actual measurement data Y2n (n=1, 2, 3, . . . ) obtained by the second light sensor SPD2 at a plurality of second ambient luminance measurement points and the design value data X2n (n=1, 2, 3, . . . ). These actual measurement data Y1n, Y2n and the design value data X1n, X2n, respectively, are similar to an actual measurement exposure code and a design exposure code stored in an EEPROM 11 as disclosed in the above-mentioned Japanese Patent Laid-Open No. 44018/1992. The actual measurement data Y1n, Y2n and the design value data X1n, X2n thus stored have the characteristics described below.

Figure 2:
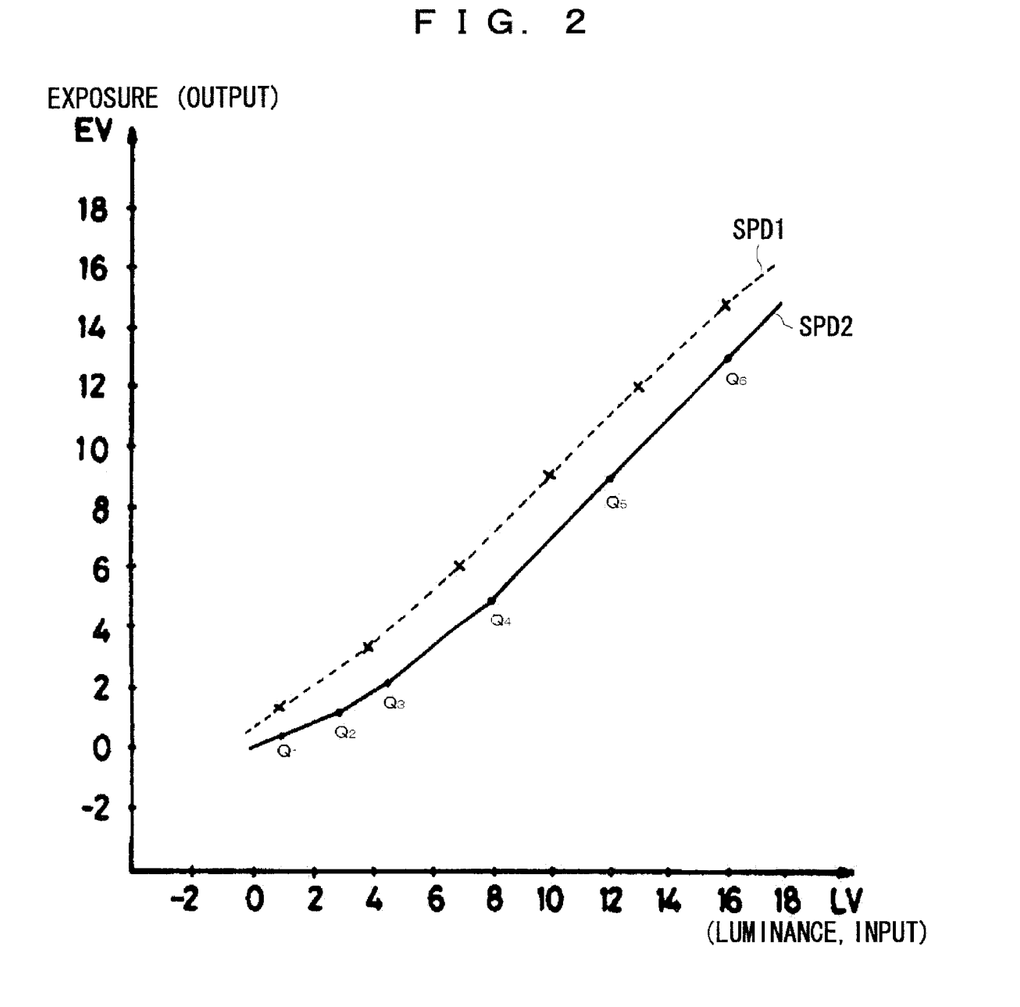
FIG. 2 is a view illustrating input/output characteristics of first and second light sensors SPD1, SPD2 and ambient luminance measurement points in FIG. 1.

Assuming, for instance, that the input/output characteristics of the first and second light sensors SPD1, SPD2 containing, for example, an output of the current-to-voltage conversion circuit 110 are as shown in FIG. 2. That is, the first light sensor SPD1 has linear input/output characteristics at ambient luminance measurement points in a measurable luminance area of LV=1 to 16 such that a predetermined accuracy is achieved throughout this range. The input/output characteristic of the light sensor SPD2, however, achieves the same predetermined accuracy only within a range where LV>5, and becomes non-linear for. LV<5, at which point the input/output characteristic varies curvilinearly. The number of ambient luminance measurement points (the number of second ambient luminance measurement points) used for taking measurements with the second light sensor SPD2 is set to be larger, or more dense, than the number of ambient luminance measurement points (the number of first ambient luminance measurement points) used for taking measurements with the first light sensor SPD1 in an ambient luminance area of LV<5, as shown in FIG. 2. More specifically, in the ambient luminance area of LV<5, the number of first ambient luminance measurement points, as indicated by "x" marks on a broken line in FIG. 2, for the light sensor SPD1 is two; whereas the number of second ambient luminance measurement points, as indicated by "." marks on a solid line in FIG. 2, for the light sensor SPD1 is three. As will be appreciated, these numbers are not limited to the above example, and can be modified as desired provided that in an ambient luminance area where an input/output characteristic of one of the light sensors is non-linear and an input/output characteristic of the other light sensors is linear, the number of ambient luminance measurement points of the light sensor presenting the non-linearity is made larger than that of the other light sensors presenting linearity.

In this manner, since the plurality of ambient luminance measurement points for the second light sensor SPD2 is set on a low ambient luminance side to be larger in number (e.g., to be more dense) than the number of ambient luminance measurement points for the first light sensor SPD1 in the same range of ambient luminance, it is possible to enhance accuracy in photometry without an increase in unnecessary actual measurement data and design value data. In other words, when an output of the arithmetic circuit 112 based on an output of the second light sensor SPD2 is non-linear and the first light sensor SPD1 is linear (e.g., on the low ambient luminance side), the amount of stored data and the number of calculations performed based on a signal output by the first light sensor SPD1 is reduced as compared to a previously-proposed apparatus in which the number of first and second luminance measurement points was equal for both of the light sensors. Accordingly, it becomes possible to enhance accuracy in photometry on the low ambient luminance side where a minute photoelectric current is treated, measurement points vary greatly due to noise, and the quantity of incident light is small. Likewise, the same results can be achieved in a similar manner when addressing range of ambient luminance values at which the of input/output characteristics of the first light sensor SPD1 are non-linear and the input/output characteristics of the second light sensor SPD2 are linear.

Figure 3:
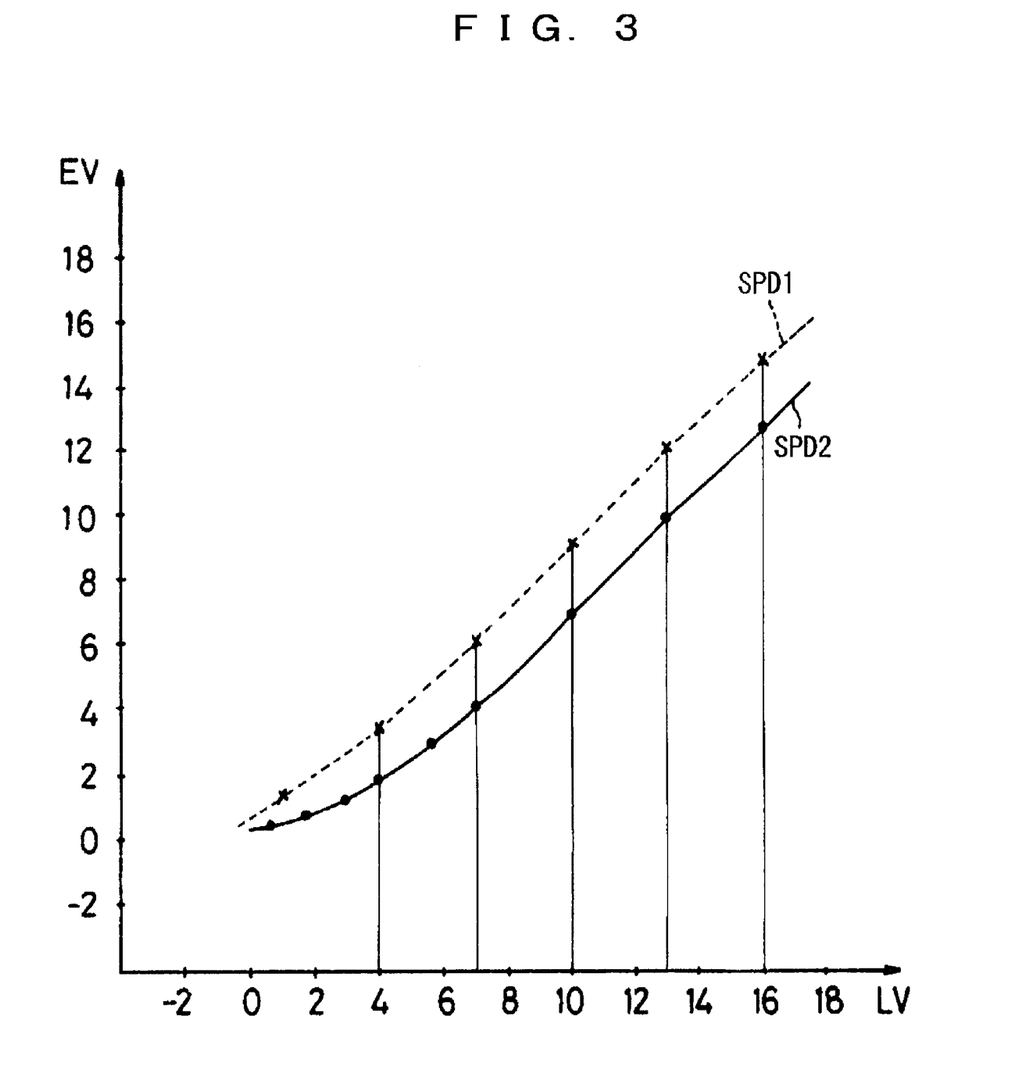
FIG. 3 is a view illustrating input/output characteristics of first and second light sensors SPD1, SPD2 and ambient luminance measurement points in FIG. 1.

In addition, while the total number of ambient luminance measurement points (the plurality of second ambient luminance measurement points) for the second light sensor SPD2 is equal to that of the ambient luminance measurement points (the plurality of first ambient luminance measurement points) for the first light sensor SPD1, the total number of second ambient luminance measurement points may be set to be larger than the total number of first ambient luminance measurement points for the first light sensor SPD1, as shown in FIG. 3. When this is done, in the case where the output of the arithmetic circuit 112 based on an output of the second light sensor SPD2 is non-linear on the low ambient luminance side and the output of the arithmetic circuit 112 based on an output of the first light sensor SPD1 is linear on the low ambient luminance side, even when the number of second ambient luminance measurement points for the second light sensor SPD2 is set on the low ambient luminance side to be larger than the number of first ambient luminance measurement points for the first light sensor SPD1, the ambient luminance measurement points can be made the same in an ambient luminance area where the input/output characteristics of the both light sensors are linear, and actual measurement data of the both light sensors SPD1, SPD2 is obtained at one ambient luminance value in this area to simplify adjustment of ambient luminance when data is stored in the EEPROM 113.

In the above-described embodiment, the number of second ambient luminance measurement points for the second light sensor SPD2 is set on the low ambient luminance side to be larger or more dense than the number of first ambient luminance measurement points for the first light sensor SPD1. It is also possible that the output of the arithmetic circuit 112 based on an output of one of the light sensors is non-linear and the output of the arithmetic circuit 112 based on an output of the other of the light sensors is linear on a high ambient luminance side, as shown in FIG. 5, depending upon selection of the measurable luminance area. As shown in FIG. 5, the input/output characteristics of the first light sensor SPD1 are non-linear at a range above LV of about 15. Contrastingly, the input-output characteristics of the second light sensor SPD2 are linear in the same range. In this case, the number of first ambient luminance measurement points for the first light sensor SPD1 is set, on the high ambient luminance side, to be larger than the number of ambient luminance measurement points for the second light sensor SPD2. When set in this manner, it becomes possible to enhance accuracy of photometry measurements without an increase in unnecessary actual measurement data and design value data in the case where an output of the arithmetic circuit 112 based on an output of the first light sensor SPD1 is non-linear on the high ambient luminance side and an output of the arithmetic circuit 112 based on an output of the second light sensor SPD2 is linear on the high ambient luminance side. In addition, in this case, the number of ambient luminance measurement points for the first light sensor SPD1 may be set to be larger than that for the second light sensor SPD2. When this is done, in the case where an output of the arithmetic circuit 112 based on an output of the first light sensor SPD1 is non-linear on the high ambient luminance side and an output of the arithmetic circuit 112 based on an output of the second light sensor SPD2 is linear on the high ambient luminance side, even when the number of ambient luminance measurement points for the first light sensor SPD1 is set on the high ambient luminance side to be larger than the number of ambient luminance measurement points for the second light sensor SPD2, the number of ambient luminance measurement points used for the respective light sensors can be made equal in an ambient luminance area where input/output characteristics of the respective light sensors are linear and actual measurement data of both light sensors SPD1, SPD2 is obtained at one ambient luminance in this area to simplify adjustment of ambient luminance when data is stored in the EEPROM 113. Also, depending upon selection of the measurable luminance area, the characteristics of the first and second light sensors, and the like, the case where the output of the arithmetic circuit 112 based on the output of one of the light sensors is non-linear and the output of the arithmetic circuit 112 based on an output of the other light sensors is linear is possible on both low and high ambient luminance sides. In this case, it suffices that the number of ambient luminance measurement points for the one light sensor is set on the high ambient luminance side to be larger than the number of ambient luminance measurement points for the other light sensors, and the number of ambient luminance measurement points for the one light sensor is set on the low ambient luminance side to be larger than the number of ambient luminance measurement points for the other light sensors. When set in this manner, it becomes possible to enhance accuracy of photometry measurements without an increase in unnecessary actual measurement data and design value data.

According to the present invention, photometry can be performed with high accuracy because the respective number of ambient luminance measurement points can be separately set in accordance with input/output characteristics of a plurality of light sensors, such as the first and second light sensors SPD1 and SPD2 described above. Also, since the number of second ambient luminance measurement points is set on a low ambient luminance side to be larger than the number of first ambient luminance measurement points, it is possible to enhance accuracy of photometry measurements without an increase in unnecessary actual measurement data and design value data in the case where an output of the brightness detecting circuit based on an output of the second light sensor SPD2 is non-linear and an output of the brightness detecting circuit based on an output of the first light sensor SPD1 is linear. In particular, it becomes possible to enhance accuracy of photometry measurements on the low ambient luminance side where a minute photoelectric current is treated, measurement points vary greatly due to noise, and the quantity of incident light is small. Also, since the number of first ambient luminance measurement points is set on a high ambient luminance side to be larger than the number of second ambient luminance measurement points, it is possible to enhance accuracy of photometry measurements without an increase in unnecessary actual measurement data and design value data in the case where the output of the brightness detecting circuit based on an output of the first light sensor SPD1 is non-linear and the output of the brightness detecting circuit based on an output of the second light sensor SPD2 is linear.

Also, provided that the number of second ambient luminance measurement points is set to be larger than the number of first ambient luminance measurement points, it is possible to enhance accuracy of photometry without an increase in unnecessary actual measurement data and design value data in the case where the output of the brightness detecting circuit based on an output of the second light sensor SPD2 is non-linear and the output of the brightness detecting circuit based on an output of the first light sensor SPD1 is linear.

Also, provided that the number of first ambient luminance measurement points is set to be larger than the number of second ambient luminance measurement points, it is possible to enhance accuracy of photometry measurements without an increase in unnecessary actual measurement data and design value data in the case where the output of the brightness detecting circuit based on an output of the first light sensor SPD1 is non-linear and the output of the brightness detecting circuit based on an output of the second light sensor SPD2 is linear.

What is claimed is:

1. A photometric apparatus comprising: a first light sensor for receiving light from a first area; a second light sensor for receiving light from a second area smaller than the first area; a brightness detecting circuit for outputting a first actual measurement value representing brightness in the first area based on an output of the first light sensor and outputting a second actual measurement value representing brightness in the second area based on an output of the second light sensor; a storage circuit for storing actual measurement data and design value data for the first light sensor obtained at a plurality of first ambient luminance measurement points and actual measurement data and design value data for the second light sensor obtained at a plurality of second ambient luminance measurement points; and a correction circuit for correcting the first and second actual measurement values, respectively, to produce first and second design values, based on the stored actual measurement data and design value data; wherein the number of one of the first and second ambient luminance measurement points is set at least at one of low or high ambient luminance values to be larger than the number of the other of the first and second ambient luminance measurement points at the one of the low and high ambient luminance values.

2. A photometric apparatus according to claim 1; wherein the second area comprises a portion of the first area.

3. A photometric apparatus according to claim 2; further comprising a focusing device disposed over the first light sensor for receiving light from an angle of visibility within the range of about 30° to 40°.

4. A photometric apparatus according to claim 3; wherein the focusing device comprises a white ball.

5. A photometric apparatus according to claim 2; further comprising a focusing device disposed over the second light sensor for receiving light from an angle of visibility within the range of about 5° to 10°.

6. A photometric apparatus according to claim 5; wherein the focusing device comprises a lens.

7. A photometric apparatus according to claim 1; wherein the correction circuit corrects the first and second actual measurement values, respectively, to produce first and second design values, by performing linear interpolation.

8. A photometric apparatus according to claim 7; wherein the linear interpolation is performed to correct a first actual measurement value $Y1a$ and a second actual measurement value $Y2a$ into a first design value $X1a$ and a second design value $X2a$ according to the following relationships:

$$X1a = X1n + (X1n+1 - X1n / Y1n+1 - Y1n)(Y1a - Y1n)$$

wherein $Y1n \leqq Y1a < (Y1n+1)$; and $$X2a = X2n + (X2n+1 - X1n / Y2n+1 - Y2n)(Y2a - Y2n)$$

where $Y2n \leqq Y2a < (Y2n+1)$;

wherein actual measurement data Y1n (n=1, 2, 3, ...), Y2n (n=1, 2, 3, ...) and design value data X1n (n=1, 2, 3, ...), X2n (n=1, 2, 3, ...) are pre-stored values, and the actual measurement data Y1n (n=1, 2, 3, ...) are obtained by the first light sensor at a plurality of first ambient luminance measurement points and the actual measurement data Y2n (n=1, 2, 3, ...) are obtained by the second light sensor at a plurality of second ambient luminance measuring points.

9. A photometric apparatus according to claim 1; wherein input/output characteristics of the first light sensor are linear in a first range of ambient luminance measurement points and non-linear outside the first range, and input/output characteristics of the second light sensor are linear in a second range of ambient luminance measurement points; wherein the first and second ranges of ambient luminance measurement points overlap in a given area, the first range of ambient luminance measurement points includes smaller ambient luminance values than the second range of ambient luminance measurement points, and the second range of ambient luminance measurement points includes larger ambient luminance values than the first range of ambient luminance measurement points.

10. A photometric apparatus according to claim 9; wherein the number of second ambient luminance measurement points is larger than the number of first ambient luminance measurement points at low ambient luminance values.

11. A photometric apparatus according to claim 9; wherein the number of first ambient luminance measurement points is larger than the number of second ambient luminance measurement points at high ambient luminance values.

12. A photometric apparatus comprising: a plurality of light sensors each for sensing light from a given area; a brightness detecting circuit for outputting an actual measurement value for each of the light sensors, the actual measurement value representing brightness in the respective given area; a storage circuit for storing actual measurement data and design value data for each of the light sensors obtained at a plurality of ambient luminance measurement points; and a correction circuit for correcting the actual measurement values to produce design values based on the stored actual measurement data and design value data; wherein the number of the ambient luminance measurement points is set separately for each of the light sensors so that the number of ambient luminance measurement points is increased in areas where respective light sensors have non-linear input/output characteristics.

13. A photometric apparatus comprising: a first light sensor for receiving light from a first area; a second light sensor for receiving light from a second area smaller than the first area; a brightness detecting circuit for outputting a first actual measurement value representing brightness in the first area based on an output of the first light sensor and outputting a second actual measurement value representing brightness in the second area based on an output of the second light sensor; a storage circuit for storing actual measurement data and design value data for the first light sensor obtained at a plurality of first ambient luminance measurement points and actual measurement data and design value data for the second light sensor obtained at a plurality of second ambient luminance measurement points; and a correction circuit for correcting the first and second actual measurement values, respectively, to produced first and second design values based on the stored actual measurement data and design value; wherein the number of second ambient luminance measurement points is set to be larger than the number of first ambient luminance measurement points, or the number of first ambient luminance measurement points is set to be larger than the number of second ambient luminance measurement points.

* * * * *